United States Patent [19]

Tachi

[11] Patent Number: 5,463,425
[45] Date of Patent: Oct. 31, 1995

[54] SYNCHRONIZING APPARATUS FOR SYNCHRONIZING AUDIO SIGNAL WITH VIDEO SIGNAL

[75] Inventor: Katsuichi Tachi, Kanagawa, Japan

[73] Assignee: Sony Corporation, Tokyo, Japan

[21] Appl. No.: 393,256

[22] Filed: Feb. 23, 1995

Related U.S. Application Data

[63] Continuation of Ser. No. 94,319, Jul. 21, 1993, abandoned.

[30] Foreign Application Priority Data

Jul. 28, 1992 [JP] Japan .................... 4-201329

[51] Int. Cl.$^6$ .................... H04N 9/475; H04N 7/04; H04N 5/76
[52] U.S. Cl. .................... 348/515; 358/343
[58] Field of Search .................... 358/343, 335, 358/341, 342, 343, 339; 348/512, 515, 518, 423, 482, 484; 360/19.1, 32, 48; H04N 7/04, 5/91, 5/76, 9/475

[56] References Cited

U.S. PATENT DOCUMENTS

| | | | |
|---|---|---|---|
| 4,428,001 | 1/1984 | Yamamura et al. | 358/335 |
| 4,839,750 | 6/1989 | Kato et al. | 360/32 |
| 4,953,168 | 8/1990 | Odaka | 358/343 |
| 4,957,686 | 6/1990 | Arai et al. | 360/32 |
| 5,043,830 | 8/1991 | Chiba | 358/341 |
| 5,068,752 | 11/1991 | Tanaka et al. | 358/339 |
| 5,172,380 | 12/1992 | Odaka | 360/48 |

Primary Examiner—James J. Groody
Assistant Examiner—Michael H. Lee
Attorney, Agent, or Firm—Jay H. Maioli

[57] ABSTRACT

A synchronizing apparatus includes an audio signal processing counter which is preset such that 735 or 736 samples of audio data exist in the vertical synchronizing signal of the video signal, such that the video and audio data are synchronized with each other within one field. Wherein a standard video signal is synchronized with the audio signal sampled by the clock and having a sampling frequency different from that of the video signal. In this synchronizing apparatus, audio signal processing counters (12), (14), (19a), (19b), (19) are preset so that 735 or 736 samples of audio data may exist in a vertical synchronizing signal of the standard video signal.

6 Claims, 13 Drawing Sheets

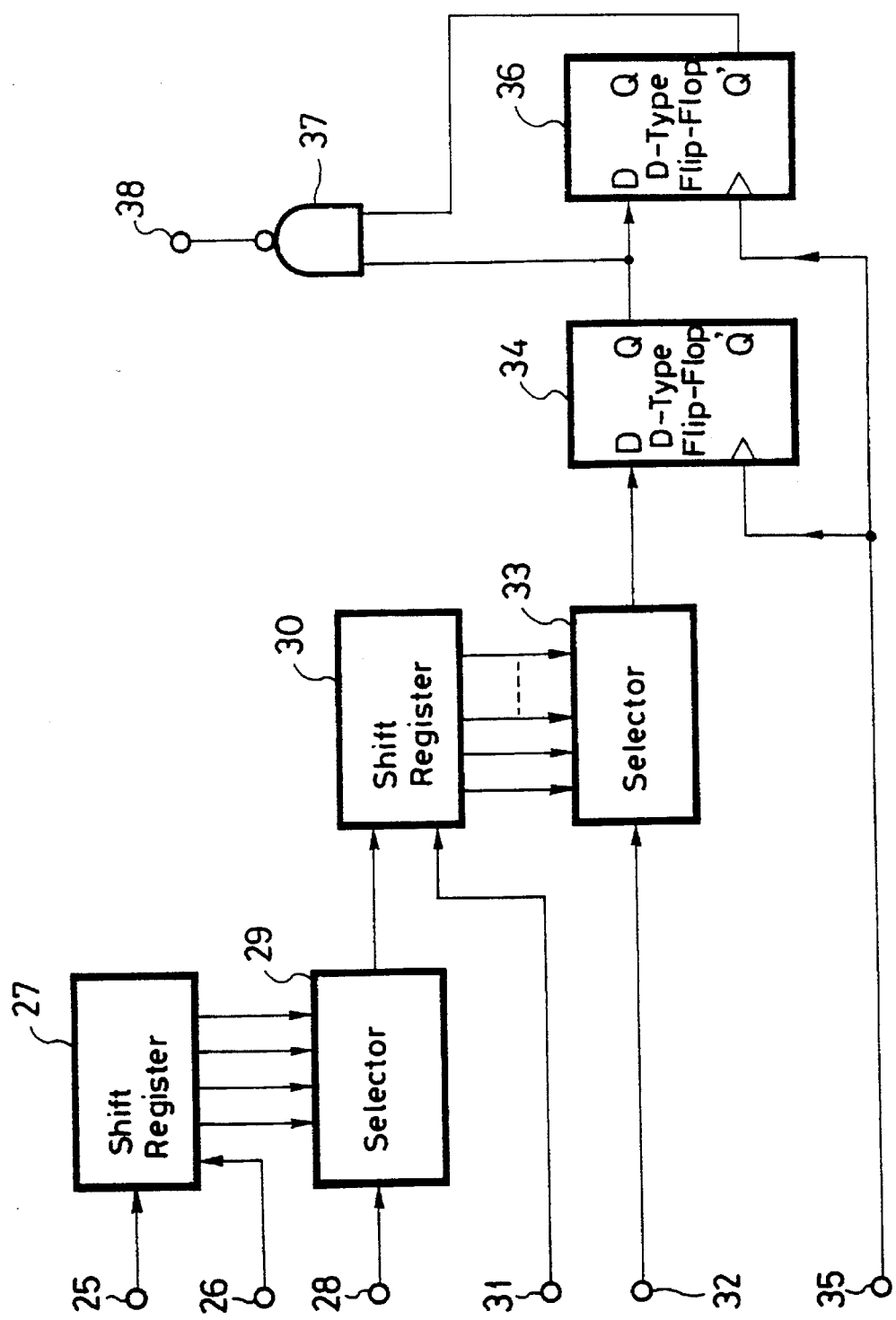

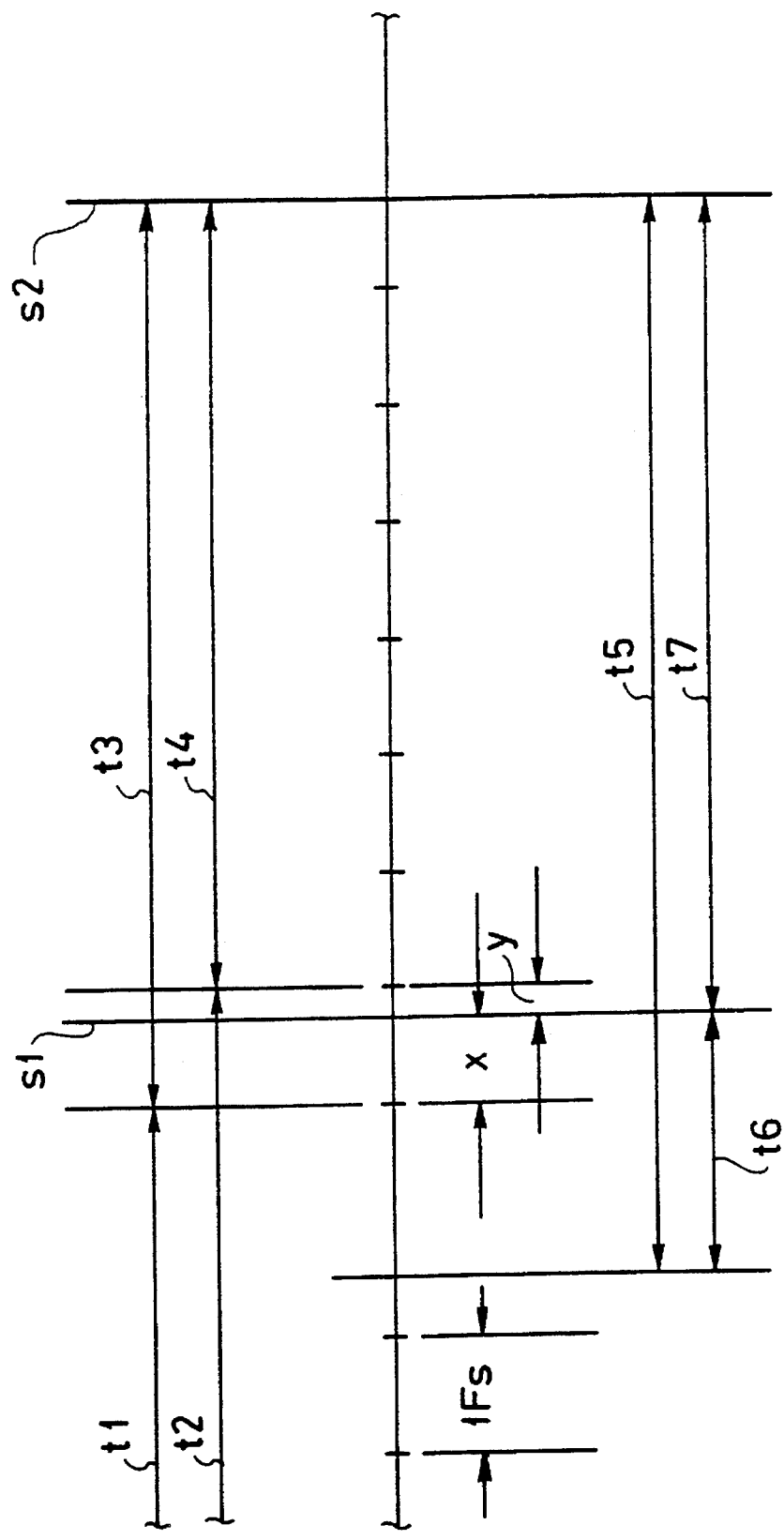

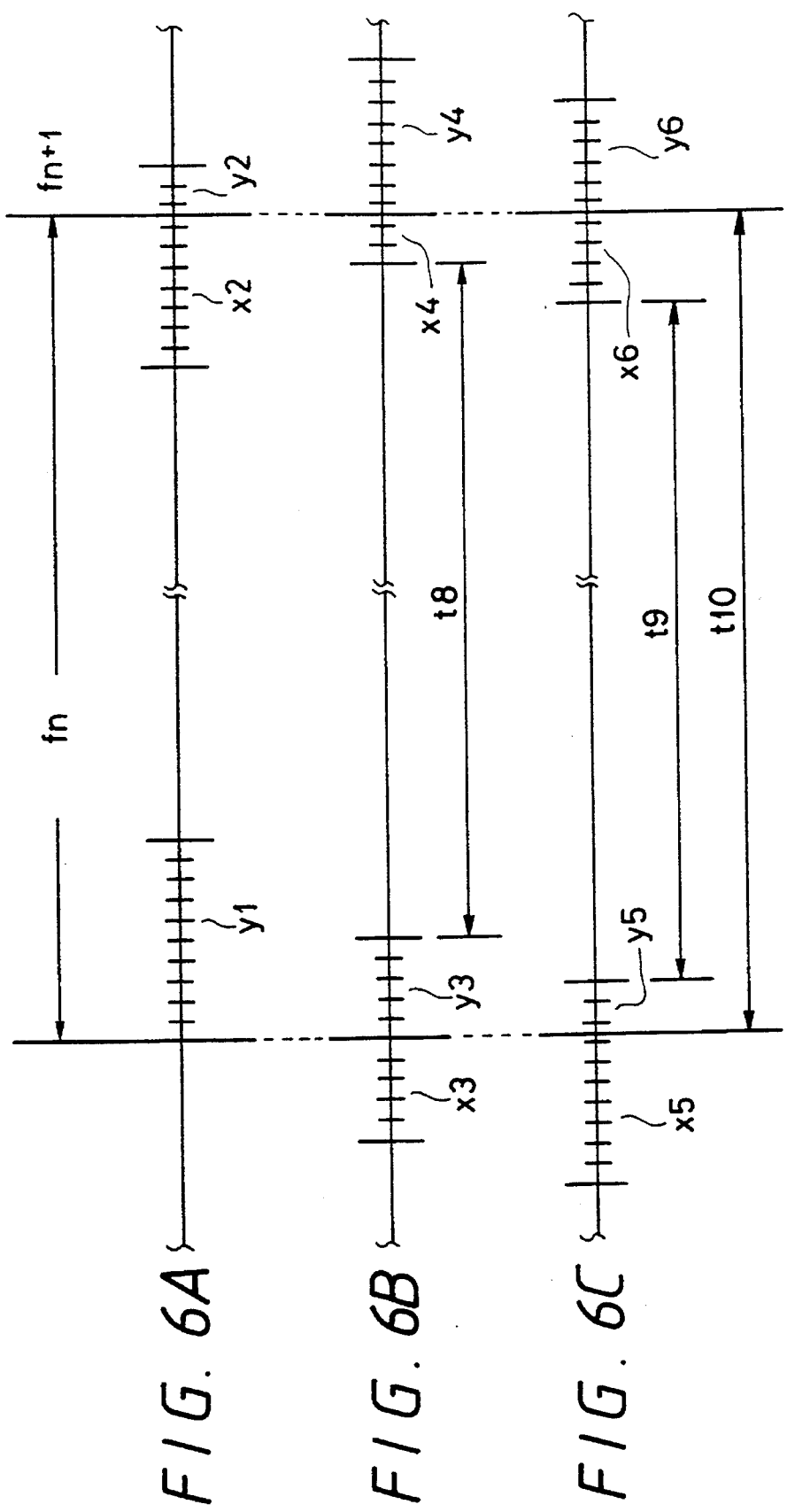

FIG. 11

| Field No. | Number of Samples | Shift Amount | Load Value |
|---|---|---|---|
| 0 | 736 | 1/910×0 | Ts/8×0 |
| 1 | 735 | 1+1/910×840 | 5+Ts/8×1 |
| 2 | 736 | 0+1/910×375 | 1+Ts/8×5 |
| ---- | ---- | ---- | ---- |
| 49 | 736 | 1+1/910×465 | 4+Ts/8×2 |
| 50 | 735 | 3+1/910×395 | 9+Ts/8×3 |
| ---- | ---- | ---- | ---- |
| 98 | 736 | 3+1/910×20 | 8+Ts/8×1 |
| 99 | 736 | 1+1/910×465 | 4+Ts/8×0 |
| 100 | 735 | 3+1/910×395 | 9+Ts/8×1 |

FIG. 12

| Field No. | Number of Samples | Shift Amount | Load Value |
|---|---|---|---|
| 124 | 736 | 1+1/910×465 | 4+Ts/8×3 |
| 125 | 736 | 3+1/910×395 | 9+Ts/8×4 |
| --- | --- | --- | --- |
| 174 | 736 | 1+1/910×465 | 4+Ts/8×1 |
| 175 | 735 | 3+1/910×395 | 9+Ts/8×2 |
| --- | --- | --- | --- |
| 200 | 736 | 1/910×0 | Ts/8×0 |

SYNCHRONIZING APPARATUS FOR SYNCHRONIZING AUDIO SIGNAL WITH VIDEO SIGNAL

This is a continuation of application Ser. No. 08/094,319 filed Jul. 21, 1993, now abandoned.

BACKGROUND OF THE INVENTION

1. Field of the Invention

The present invention relates to a synchronizing apparatus for use with an editing apparatus that edits a video signal and an audio signal or the like, for example.

2. Description of the Prior Art

U.S. Pat. No. 4,428,001 describes a conventional editing apparatus that edits a video signal. The conventional editing apparatus that edits a video signal and an audio signal uses a synchronizing apparatus for synchronizing a video signal and an audio signal.

A synchronizing method of synchronizing a video signal and an audio signal by this conventional synchronizing apparatus will be described below in which case a video signal is an NTSC video signal and a sampling frequency of an audio signal is 44.1 kHz.

A field frequency of the NTSC video signal becomes $315/22$ MHz (=14.31818 MHz)÷910÷262.5=60×$1000/1001$ Hz, i.e., 59.94005994 Hz.

The number of samples of digital audio signal per field becomes 44100 Hz/(60×$1000/1001$ Hz), i.e., 735.735. As will be understood from this value, the number of samples of the digital audio signal per field is 735.735 and contains a fraction of 0.735 so that the digital audio signal cannot be synchronized with the video signal at every field.

To solve this problem, it is proposed that the digital audio signal is synchronized with the video signal at every 200 fields in which the number of samples of the digital audio signal coincides with a vertical synchronizing signal. According to this well-known method, a gain of a sync. generator is locked in synchronism with a reader sequence. The number of samples of digital audio signals at 200 fields is 44.1×$10^3$ (315/22×$10^6$÷910÷525÷100), i.e., 147147. According to the prior art, by utilizing the above technique, the number of samples per field is counted by a counter and this count operation is concluded in 200 fields at the unit of 4 fields.

A pattern that 147147 samples of 200 fields are counted by the counter becomes (735+735×3)+(735+736×3)×49. Audio samples are allocated to the fields as follows. Field Nos. are assigned to the fields and digital audio data is counted by a count number predetermined in response to the field No. when a video signal is reproduced. Then, digital audio data corresponding to the count number is allocated to the field of the corresponding video signal.

FIG. 1 of the accompanying drawings is a schematic diagram used to explain an example of a conventional synchronizing apparatus. In FIG. 1, reference numerals f1 to f200 depict 1st field to 200th field and g1 to g200 depict fractions (shift amounts) of the number of samples of digital audio at the fields, respectively. In FIG. 1, reference numeral s1 designates a vertical synchronizing position.

As shown in FIG. 1, the shift amount g1 at the 1st field f1 relative to the vertical synchronizing position s1 becomes 0.735 and the count number becomes 735; the shift amount g2 at the 2nd field f2 relative to the vertical synchronizing position s1 becomes 1.47 and the count number becomes 735; the shift amount g3 at the 3rd field f3 relative to the vertical synchronizing position s1 becomes 2.205 and the count number becomes 735; the shift amount g4 at the 4th field f4 relative to the vertical synchronizing position s1 becomes 2.94 and the count number becomes 735; and the shift amount g5 at the 5th field f5 relative to the vertical synchronizing position s1 becomes 3.675 and the count number becomes 735. The shift amount g5 at the 5th field f5 becomes maximum.

The shift amount g6 at the 6th field f6 relative to the vertical synchronizing position s1 becomes 3.41 that is smaller than the shift amount g5 at the 5th field f5 by 0.265 and the count number becomes 736; the shift amount g7 at the 7th field f7 relative to the vertical-synchronizing position s1 becomes 3.145 that is smaller than the shift amount g6 at the 6th field by 0.265 and the count number becomes 736; the shift amount g8 at the 8th field f8 relative to the vertical synchronizing position s1 becomes 2.88 that is smaller than the shift amount g7 at the 7th field by 0.265 and the count number becomes 736; the shift amount g9 at the 9th field f9 relative to the vertical synchronizing position s1 becomes 3.615 that is larger than the shift amount g8 at the 8th field f8 by 0.735 and the count number becomes 735; the shift amount g10 at the 10th field f10 relative to the vertical synchronizing position s1 becomes 3.35 that is smaller than the shift amount g9 at the 9th field f9 by 0.265 and the count number becomes 736; the shift amount g11 at the 11th field f11 relative to the vertical synchronizing position s1 becomes 3.085 that is smaller than the shift amount g10 at the 10th field f10 by 0.265 and the count number becomes 736; the shift amount g12 at the 12th field f12 relative to the vertical synchronizing position s1 becomes 2.82 that is smaller than the shift amount g11 at the 11th field f11 by 0.265 and the count number becomes 736; . . . ; the shift amount g196 at the 196th field f196 relative to the vertical synchronizing position s1 becomes 0.06 and the count number becomes 736; the shift amount g197 at the 197th field f197 relative to the vertical synchronizing position s1 becomes 0.795 that is larger than the shift amount g196 at the 196th field f196 by 0.735 and the count number becomes 735; the shift amount g198 at the 198th field f198 relative to the vertical synchronizing position s1 becomes 0.53 that is smaller than the shift amount g197 at the 197th field f197 by 0.265 and the count number becomes 736; the shift amount g199 at the 199th field f199 relative to the vertical synchronizing position s1 becomes 0.265 that is smaller than the shift amount g198 at the 198th field f198 by 0.265 and the count number becomes 736; and the shift amount g200 at the 200th field f200 becomes 0 that is smaller than the shift amount g199 at the 199th field f199 by 0.265 and the count number becomes 736. Thus, the processing is ended. That is, the digital audio signal is synchronized with the video signal by resetting the counter at the 200th field f200.

When the number of samples of digital audio data is calculated as (735+735×3)+(735+736×3)×49=147147 as described above, the shift amount g5 (3.675) of five times in four times and one time of 735 samples becomes maximum. Subsequently, as shown by arrows h1 and h2 of FIG. 1, each sample is shifted 0.06 from the shift amount g4 (2.94) at the 4th field f4 at the unit of (735+736×3) and returned to the original sample by 0.06×49, i.e., 2.94 samples.

As shown in FIG. 1, the shift amount g4 at the 4th field f4 is 2.94 and the shift amount g8 at the last 8th field f8 of the 5th field f5 to the 8th field f8 is 2.88, i.e., there is a shift amount of 0.06. Similarly, the shift amount g8 at the 8th field f8 and the shift amount g12 at the 12th field f12 of the 9th field f9 to the 12th field f12 is 2.82, i.e., there is a shift amount of 0.06.

Similarly, the shift amount g196 at the 196th field f196 is 0.06 and the shift amount g200 at the last 200th field f200 of the 197th field f197 to the 200th field f200 is 0, i.e., there is a shift amount of 0.06.

When the audio signal and the video signal are edited in actual practice, a vertical synchronizing (sync.) signal is generated on the basis of a reference video signal, for example. Then, after the counter is reset by this vertical sync. signal, the counter starts the counting and the audio signal and the video signal are synchronized by the pattern of (735+735×3)+(735+736×3)×49 at every 200 fields.

Since however the generator-lock circuit is effected in synchronism with the sequence of a reader in actual practice, the field number read by the reader and the field number generated by the sync. generator are shifted from each other by one sample. Therefore, upon editing, a pre-roll time of 200 fields is required in addition to a time during which a tape speed is fine adjusted to match the tape positions.

The pre-roll time of 200 fields becomes $\frac{1}{60} \times \frac{1001}{1000} \times 200$, i.e., 3.336666666 seconds. In this case, $\frac{1001}{1000}$ represents a ratio of a color frequency 15.73 kHz and a black and white frequency 15.75 kHz.

There is then the disadvantage that the conventional synchronizing apparatus requires the pre-roll time of 200 fields, i.e., 3.336666666 in addition to the time during which the tape speed is fine adjusted to match the tape positions.

OBJECTS AND SUMMARY OF THE INVENTION

In view of the aforesaid aspects, it is an object of the present invention to provide an improved synchronizing apparatus in which the aforesaid shortcomings and disadvantages encountered with the prior art can be eliminated.

Another object of the present invention is to provide a synchronizing apparatus in which video and audio data can be synchronized with each other during one field.

Still another object of the present invention is to provide a synchronizing apparatus in which editing of very high accuracy is made possible without the need for time for fine adjusting a tape speed in addition to a pre-roll time when applied to an editing apparatus.

According to a first aspect of the present invention, there is provided a synchronizing apparatus for synchronizing an audio signal with a standard video signal, a sampling frequency of the audio signal differing from a sampling frequency of the standard video signal which comprises a counter for outputting a count signal representing a count value, a preset circuit for presetting a preset value n or n+1 to the counter, the preset value n or n+1 representing the number of samples of the audio signals to be inserted into a vertical interval of the video signal, and a memory for memorizing the audio signal and outputting the memorized audio signal thereby according to the count signal, whereby an audio signal synchronized with the standard video signal are outputted from the memory.

In accordance with a second aspect of the present invention, there is provided a synchronizing apparatus for synchronizing an audio signal with a standard video signal, a sampling frequency of the audio signal differing from a sampling frequency of the standard video signal which comprises a counter for outputting a count signal representing a count value, a preset circuit for presetting a preset value n or n+1 to the counter, the preset value n or n+1 representing the number of samples of the audio signals to be inserted into a vertical interval of the video signal, and a synchronizing circuit for synchronizing the audio signal with the standard video signal according to the count signal.

The above and other objects, features, and advantages of the present invention will become apparent from the following detailed description of an illustrative embodiment thereof to be read in conjunction with the accompanying drawings, in which like reference numerals are used to identify the same or similar parts in the several views.

BRIEF DESCRIPTION OF THE DRAWINGS

FIG. 3 is a block diagram showing a circuit arrangement of a main portion of the synchronizing apparatus according to the embodiment of the present invention;

FIG. 5 is a diagram used to explain various timing relationships of the synchronizing apparatus according to the embodiment of the present invention;

FIGS. 6A to 6C are diagrams used to explain the rounding off of fractions of samples in each vertical synchronizing signal in the synchronizing apparatus according to the embodiment of the present invention, respectively;

FIGS. 11 and 12 are tables used to explain the synchronizing apparatus according to the embodiment of the present invention.

DETAILED DESCRIPTION OF THE PREFERRED EMBODIMENT

A synchronizing apparatus according to an embodiment of the present invention will hereinafter be described with reference to the drawings. Throughout this specification the symbol "910fH" represents a signal of 14.31818 MHz, that is, four times the subcarrier frequency of an NTSC signal, the symbol "fH" represents a signal at the horizontal scanning frequency of an NTSC signal, the symbol "Fs" represents a signal at 44.1 KHz, that is the audio sampling frequency, and the symbol "Ts" represents a shift amount relative to a vertical sync. signal.

Figure 2:
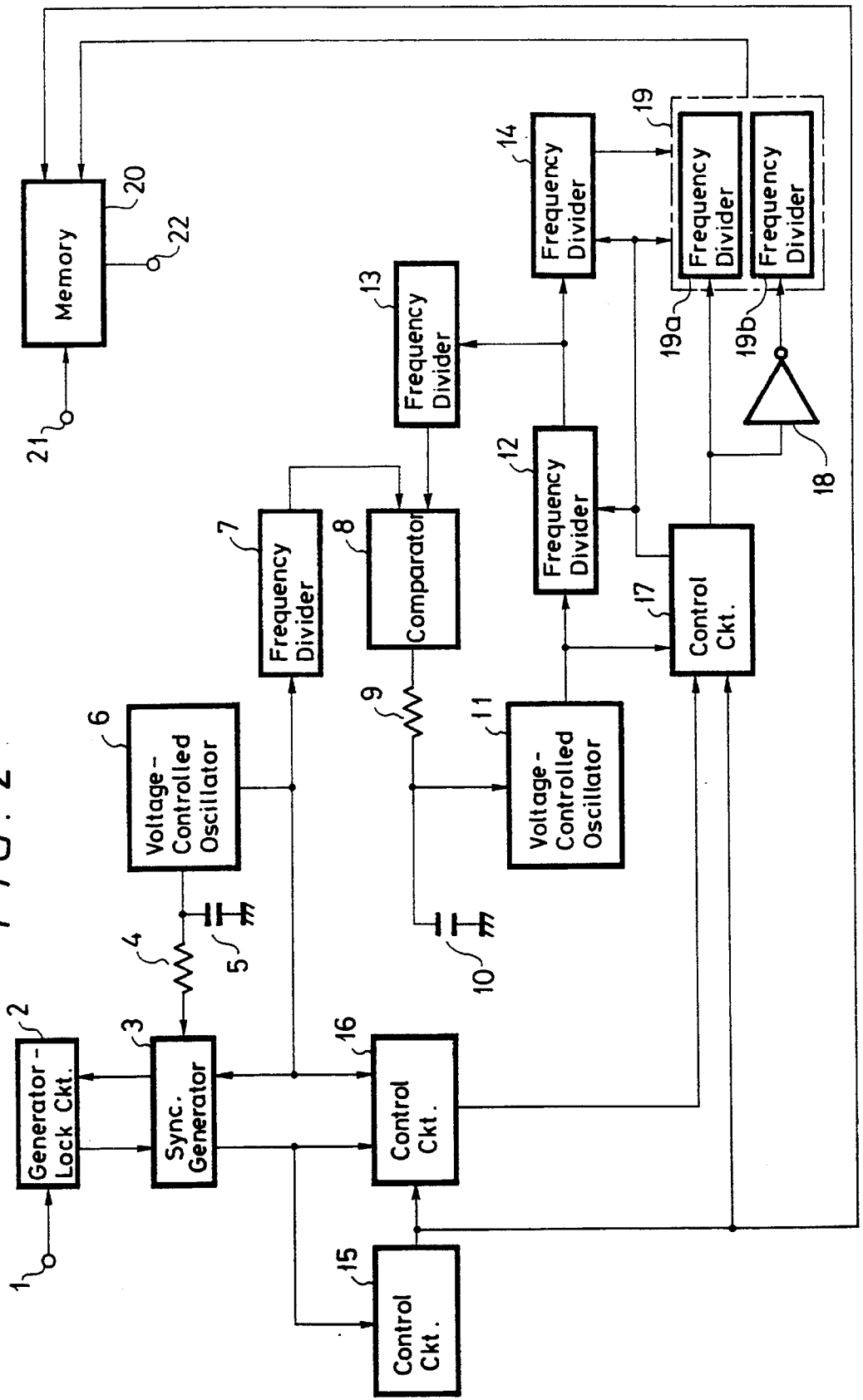
FIG. 2 is a block diagram showing a circuit arrangement of a synchronizing apparatus according to an embodiment of the present invention.

As shown in FIG. 2, there is provided an input terminal 1 to which a reference video signal, for example, is supplied.

The reference video signal supplied to the input terminal 1 through an editing apparatus body or from the outside is supplied to a generator-lock circuit 2. The reference video signal may be an NTSC video signal and is used for the synchronization of a digital audio system clock.

The generator-lock circuit 2 generates a vertical synchronizing (sync.) signal on the basis of the reference video signal from the input terminal 1 and a generator-lock clock signal (e.g., 14.31818 MHz) supplied thereto from a sync. generator 3. The vertical sync. signal from the generator-lock circuit 2 is supplied to the sync. generator 3.

The sync. generator 3 generates a vertical sync. signal on the basis of a clock signal having a frequency of 14.31818 MHz (e.g., frequency four times as high as the subcarrier frequency of the NTSC video signal) supplied thereto from a voltage-controlled oscillator 6. The vertical sync. signal from the sync. generator 3 is supplied to controllers 15, 16. Also, the sync. generator 3 generates an error signal and supplies the same to the voltage-controlled oscillator 6 through a low-pass filter formed of a resistor 4 and a capacitor 5.

A composite sync. signal is generated by a combination of an external sync. signal and a sync. signal thus generated from the generator-lock circuit 2 and the sync. generator 3 to thereby generate various timing signals.

The voltage-controlled oscillator 6 generates a clock signal on the basis of the voltage of the error signal from the sync. generator 3. The clock signal from the voltage-controlled oscillator 6 is supplied to a control circuit 16, the sync. generator 3 and a frequency divider 7. If the above composite sync. signal is an NTSC composite sync. signal, then all timing signals are generated from the clock signal of 910fH (i.e., 14.31818) generated from the voltage-controlled oscillator 6.

A control circuit 15 counts the vertical sync. signal from the sync. generator 3 to generate a pulse of a period per 200 fields (corresponding to 200 vertical sync. signals). This pulse is supplied to control circuits 16, 17 and a memory circuit 20. That is to say, data from 0 to 199 can be obtained by operating a 200-adic counter in response to the vertical sync. signal from the sync. generator 3. Upon playback, address data is loaded from the editing apparatus body (not shown) to thereby generate field number information. This field number information is supplied to the control circuits 16, 17 and the memory circuit 20.

The control circuit 16 supplies a load control signal to the control circuit 17 on the basis of the vertical sync. signal from the sync. generator 3, the field No. information from the control circuit 15 and the clock signal from the voltage-controlled oscillator 6. It is determined by the field number information from the control circuit 15 whether digital audio data of one field is 735 samples or 736 samples. The control circuit 16 generates Ts/8 data and Ts data (as well as other signals to be described below) and supplies those data to the control circuit 17.

The control circuit 17 supplies load signals to frequency dividers 14, 19 on the basis of the field number data from the control circuit 15 and the load control signal from the control circuit 16 and also supplies a switching signal to the frequency divider 19.

Further, the control circuit 17 loads data "0" to a frequency divider 12, which will be described later on, data F (data representative of Ts/8 shift amount from the vertical sync. signal) from the control circuit 16 to the frequency divider 14 and data TS (data representative of Fs shift amount from the vertical sync. signal) from the control circuit 16 to the frequency divider 19 on the basis of the load control signals.

The frequency divider 19 comprises two frequency dividers 19a, 19b. The frequency divider 19a is reset by the load control signal from the control circuit 17. The frequency divider 19a also is operated as a 1/735-counter to count the frequency-divided signal (Ts data) from the frequency divider 14 when the switching signal from the control circuit 17 is at high "1" level.

Similarly, the frequency divider 19b is reset by the load control signal from the control circuit 17. Also, the frequency divider 19b is operated as a 1/736-counter to count the frequency-divided signal (Ts data) from the frequency divider 14 when the switching signal from the control circuit 17 is at low "0" level. More specifically, when the control circuit 17 supplies the high "1" level signal to the frequency divider 19b, this high "1" level signal is inverted to low "0" level signal by which the frequency divider 19a is disabled. When the control circuit 17 supplies the low "0" level signal to the frequency divider 19a, the low "0" level signal is inverted by the inverter 18 to the high "1" level signal by which the frequency divider 19a is energized.

A circuit arrangement that causes the frequency divider 14 to output the frequency-divided signal corresponding to the Ts data will be described below.

There is shown a voltage-controlled oscillator 11 which derives a clock signal having a frequency of 22.579 MHz (44.1 kHz×512:512Fs), for example. In other words, a phase-locked locked loop (PLL) is arranged such that a relationship between 22.579 MHz and 14.31818 MHz falls in a relation of 4928 (77×64):3125. This clock signals from the voltage-controlled oscillator 11 is supplied to the frequency divider 12.

The frequency divider 12 counts the clock signal from the voltage-controlled oscillator 11 and divides the same by 64 (i.e., Fs of 8 times). The signal thus frequency-divided is supplied to the frequency dividers 14 and 13, respectively.

The frequency divider 13 counts the frequency-divided signal (Fs of 13 times) from the frequency divider 12 and divides the same by 77. This frequency-divided signal from the frequency divider 13 is supplied to a comparator 8. The comparator 8 compares the frequency-divided signals from the frequency-dividing circuits 7 and 8 and supplies a compared result to the voltage-controlled oscillator 11 through the low-pass filter formed of the resistor 9 and the capacitor 10 as a control signal.

Since the frequency divider 7 counts the clock signal having the frequency of 14.31818 MHz from the voltage-controlled oscillator 6 and divides the same by 3125 to obtain the signal having the frequency of 4.582 KHz, the comparator 8 compares the reference signal having the frequency of 4.582 KHz with the signal that results when the signal of FS of 8 times is divided by 77 {22.579 MHz/(77× 64)=4.582 kHz}.

The frequency-divided signal finally output from the frequency divider 19 is supplied to the memory circuit 20 as an address signal. The memory circuit 20 is formed of a memory controller and a memory, though not shown. Digital audio data from the editing apparatus body, not shown, through an input terminal 21 is written in and/or read out from the memory circuit 20 on the basis of the address signal from the frequency divider 19 and the signal (user address) from the control circuit 15. The digital audio data read out from the memory circuit 20 is recorded on an audio recording area of a magnetic tape accommodated within a tape cassette loaded onto a VTR (video tape recorder) not shown.

The control circuit 17 may selectively preset the preset value of the frequency divider 19 according to a difference between the input timing of a vertical synchronization signal of a standard video signal, for example, an NTSC signal, and the timing of a final signal from the frequency divider 19.

An inside circuit arrangement of the control circuit 17 shown in FIG. 2 will be described with reference to FIG. 3.

Referring to FIG. 3, the vertical sync. signal from the sync. generator 3 is supplied to an input terminal 25. The horizontal pulse signal from the sync. generator 3 is supplied to an input terminal 26. The N data from the control circuit 16 is supplied to an input terminal 28. The 910 fH pulse (14.31818 MHz) from the voltage-controlled oscillator 6 is supplied to an input terminal 31, and the M data from the control circuit 16 is supplied to an input terminal 32. A 512Fs pulse from the voltage-controlled oscillator 11 is supplied to an input terminal 35. One horizontal period corresponds to 910 pulses (the number of 4Fsc pulses, each having a frequency 4 times the subcarrier frequency).

Figures 4A, 4B, 4C, 4D, 4E, 4F, 4G, 4H, 4I:
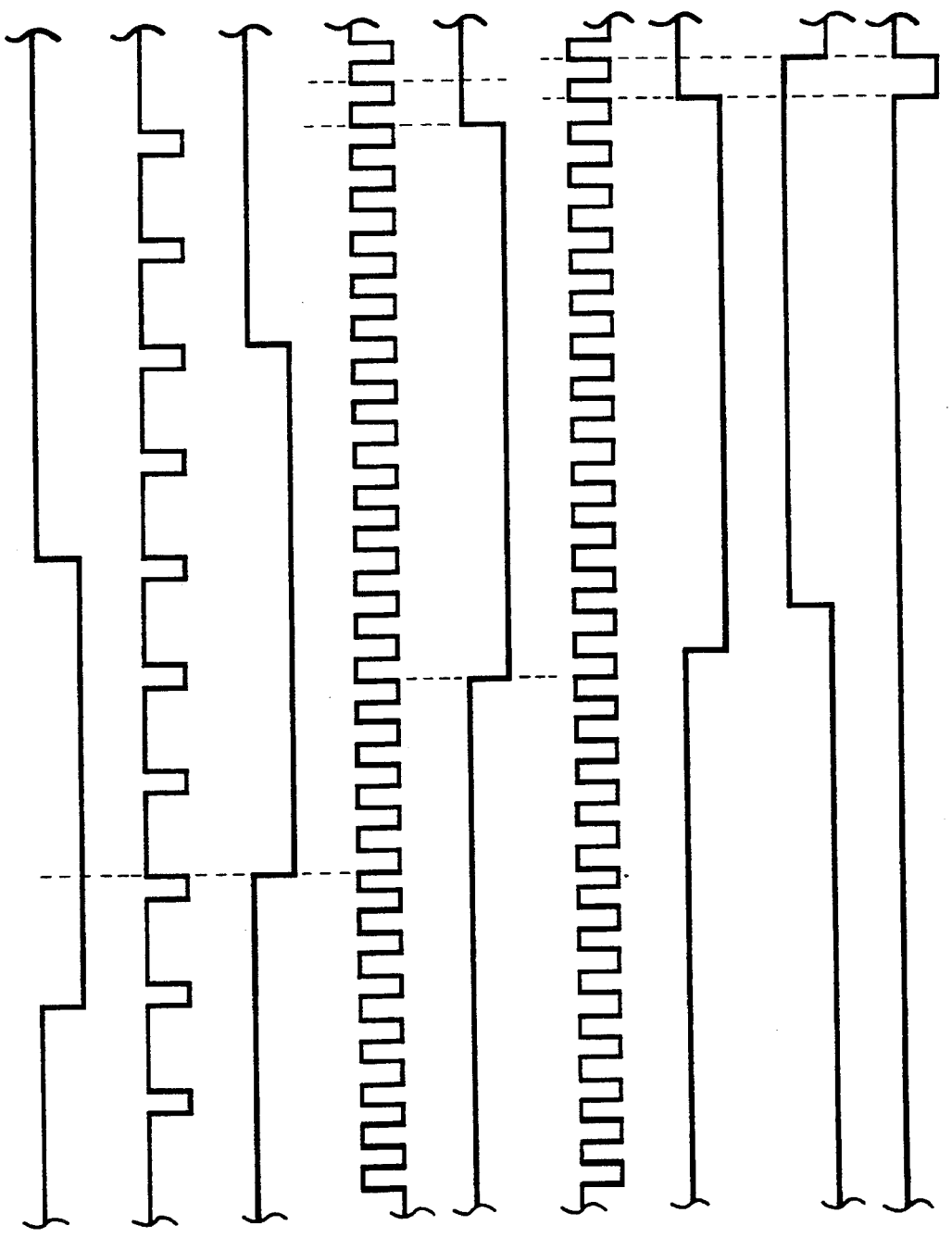
FIGS. 4A through 4I are timing charts used to explain the synchronizing apparatus according to the embodiment of the present invention, respectively.

In the control circuit 17 shown in FIG. 2, the vertical sync. signal (see FIG. 4A) supplied from the input terminal 25 is shifted by a horizontal pulse signal shown in FIG. 4B in the shift register 27 shown in FIG. 3 to generate vertical sync. signals having four different phases which are then supplied to the selector 29.

The selector 29 selects the vertical sync. signals from the shift register 27 on the basis of the fH data supplied thereto from the input terminal 28 and supplies a selected vertical sync. signal (see FIG. 4C) to the shift register 30. That is to say, the vertical sync. signal is phase-controlled at the unit of horizontal sync. signal by the shift register 27 and the selector 29.

The shift register 30 shifts the vertical sync. signal (see FIG. 4C) from the selector 29 on the basis of the 910fH pulse (see FIG. 4D) applied thereto from the input terminal 31 to supply a plurality of vertical sync. signals to a selector 33.

The selector 33 selects the vertical sync. signal from the shift register 30 on the basis of the fH/910 data from the control circuit 16 (FIG. 2) and supplies a selected vertical sync. signal (see FIG. 4E) to a data input terminal D of a D-type flip-flop circuit 34, for example.

The shift register 30 and the selector 33 phase-control the vertical sync. signal at the unit of 910fH (14.31818 MHz) on the basis of the fH/910 data from the control circuit 16.

The vertical sync. signal (see FIG. 4E) output from the selector 33 is latched by a signal of 512Fs (clock signal from the voltage-controlled oscillator 11) supplied from the input terminal 35 in the D-type flip-flop circuit 34, and then output from a non-inverting output terminal Q of the D-type flip-flop circuit 34 (see FIG. 4G).

The vertical sync. signal (see FIG. 4G) output from the D-type flip-flop circuit 34 is supplied to a NAND circuit 37 and a data input terminal D of a D-type flip-flop circuit 36.

The D-type flip-flop circuit 36 latches the vertical sync. signal from the D-type flip-flop circuit 34 by the 512Fs signal from the input terminal 35 and then outputs the latched output from an inverting output terminal Q' thereof.

The vertical sync. signal output from the D-type flip-flop circuit 36 results from, as shown in FIG. 4H, delaying the vertical sync. signal from the D-type flip-flop circuit 34 by one period of the 512Fs signal supplied thereto from the input terminal 35 and then inverting the delayed signal.

The vertical sync. signal (see FIG. 4G) output from the D-type flip-flop circuit 34 and the vertical sync. signal (see FIG. 4H) output from the D-type flip-flop circuit 36 are supplied to the NAND circuit 37, in which they are calculated in an AND fashion and then inverted, thereby being converted into a signal shown in FIG. 4I, i.e., the load control signal that was described earlier in connection with FIG. 2.

Prior to the description of operation of the synchronizing apparatus shown in FIG. 2, the method of synchronizing the video signal and the audio signal at every field according to the present invention will be described sequentially with reference to FIGS. 5 to 13.

FIG. 5 is a diagram used to explain a relationship among timings at which the load data are loaded into the frequency dividers 12, 14 and 19 shown in FIG. 2, the position of the vertical sync. signal and the count value of the frequency divider 19.

Figure 1:
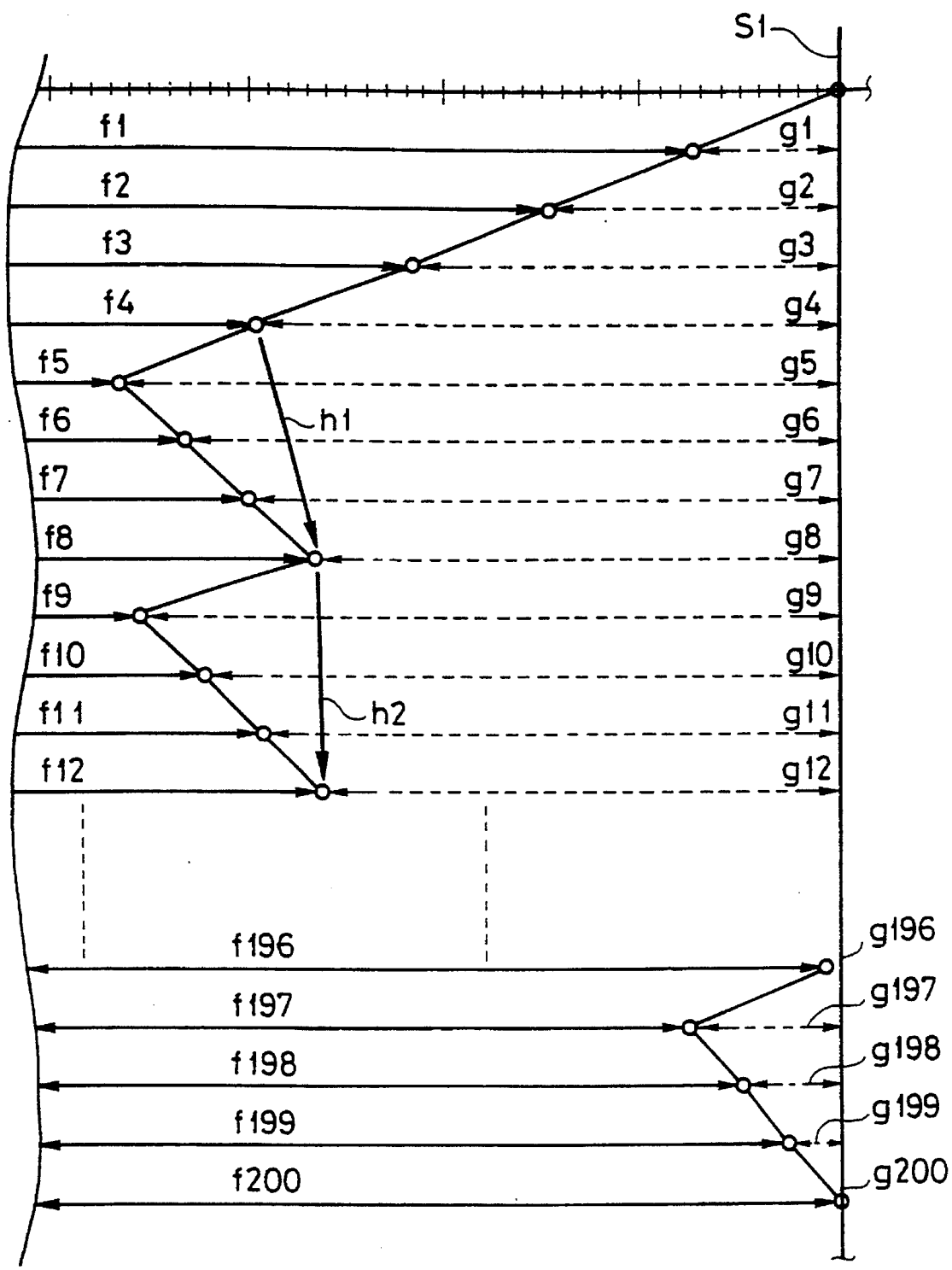
FIG. 1 is a schematic diagram used to explain an example of a conventional synchronizing apparatus.

As earlier noted with reference to FIG. 1, the digital audio data (in the case of 44.1 kHz) corresponding to one field generates 735.735 samples and the fraction of 0.735, whereafter the fraction thereof is changed at every field. Then, when 4 fields are set to the unit and 200 fields are expressed as $(735+735\times3)+(735+736\times3)\times49=147147$ samples, the fraction is reduced by 0.06 sample at each of every 4 fields from the 4th field f4 and the fraction is lost at the 200th field f200.

If a vertical synchronizing position s1 is selected to be a boundary between the fields and the first field is set to 736-adic interval t2, then an interval x becomes 0.735 so that one sample (1Ts) extends to the next field. Consequently, a fraction y at the beginning of the next field becomes 0.265. If the next field is set to 735-adic, then the number of samples per field becomes 735.735 samples so that the last portion of the next field becomes 735.735-0.265-735, i.e., 0.47. Therefore, the starting portion of the next field becomes 1-0.47, i.e., 0.53.

If the portion from 0th field to 199th field (1st field f1 to 200th field 200f in FIG. 1) of the NTSC video signal, for example, is sampled by the sampling frequency, 44.1 kHz, then a condition that one field is made to have 735 samples by rounding the fraction of samples in each vertical sync. signal results in the fraction of the current field number being raised and the fraction of the next field being omitted as shown in FIGS. 6A to 6C.

As shown in FIG. 6A, when the current field fn is sampled by the sampling frequency of 44.1 kHz, the number of samples during one field period shown by t10 becomes 735.735. In FIG. 6A, y1 designates one sample, x2 designates a fraction of 0.735 and y2 designates a leading fraction 1-0.735 of the next field fn+1, i.e., 0.265.

The condition that there are obtained 735 samples by rounding the fraction of the numbers of samples within the field will be described below. As shown in FIG. 6B, when a fraction x3 of the field just before the current field fn is, for example, 0.500 (at that time, a leading fraction y3 of the current field fn becomes 0.500), the fraction x3 is raised. In that case, since the number of samples within an interval t8 to a fraction x4 from the beginning by the rounding-up becomes 735 samples and the fraction x4 becomes 0.235 (accordingly, a fraction y4 becomes 0.765). Therefore, the fraction x4 is omitted.

On the other hand, as shown in FIG. 6C, when a fraction x5 of the field just before the current field fn is 0.760 (a leading fraction y5 of the current field fn at that time becomes 0.240), the fraction x5 is raised. In this case, the number of samples in an interval t9 from the rounding-up to a leading fraction x6 becomes 735 samples. Also, the fraction x6 becomes 0.495 (accordingly, a fraction y6 becomes 0.505) so that this fraction x6 is omitted.

The times when the raising and omitting conditions are matched will be described with reference to FIGS. 6B and 6C. Since any of fractions of y3+x4 and y5+x6 within one field become 0.735, the raising and the omitting conditions matched only when the raising on the current field fn is larger than 0.500 and less than 0.760 and the omission on the next field fn+1 is larger than 0.235 and less than 0.495.

There are 200 phases for the vertical sync. signal and the fraction is an integral multiple of 0.005. Explaining this in the case of FIG. 6C, (0.495−0.235)/0.005+1 (0.235 also is included)=53 fields becomes the condition of being 735 samples. That is, all samples that cannot satisfy this condition become 736 samples. Proving this condition, it is to be noted that 735×53+736×(200−53)=147147 samples is established.

A relationship between the frequency 4 times (4Fsc) of the subcarrier in the NTSC signal and 8 times (8Fs) of sampling frequency 44.1 kHz of the digital audio signal is 3125:77. Therefore, a point at which 3125:77 is established must be detected in order to synchronize these two frequencies. In actual practice, from a system arrangement standpoint, it is advantageous to preset the frequency dividers 12, 14 and 19 near the starting point of 735-adic or 736-adic after the vertical sync. signal.

In order to detect a point at which a relationship between 4Fsc and 8Fs at each field is established, a relationship between 3125:77 of one field must be checked.

One field at the sampling frequency of 8Fs that is 8 times the sampling frequency is established by 735.735×8=5885.88 pulses. If this calculated result is divided by 77, then 5885.88/77=76.44 is established. Since the fraction 0.44 in this case is accumulated at every field number, preset points at each field become different.

Figure 7:
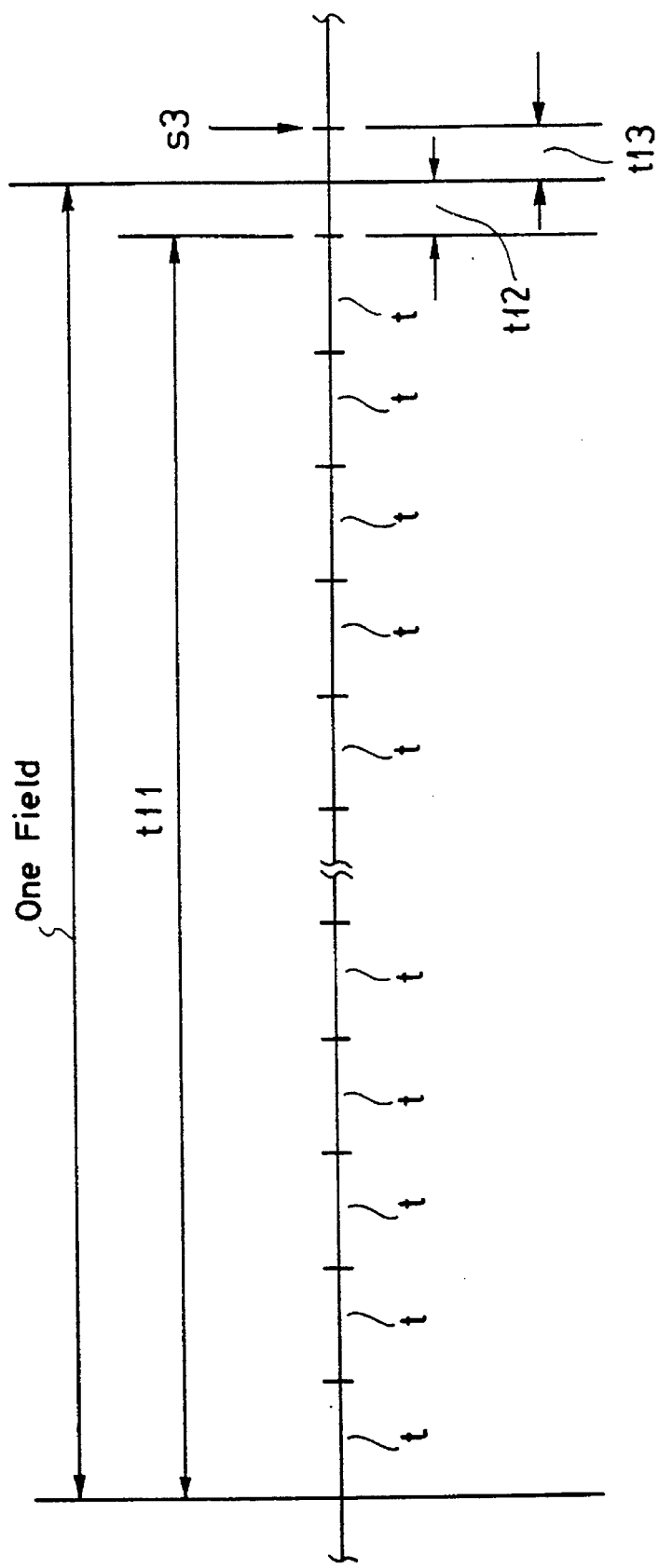
FIG. 7 is a diagram used to explain the calculation of a presettable point in the synchronizing apparatus according to the embodiment of the present invention.

FIG. 7 is a diagram used to explain the aforesaid calculation. As shown in FIG. 7, if one field is divided by t (t=77), then there are obtained 76 t, i.e., the interval t11 becomes 76 (=77×76=5852) and a fraction t12 becomes 0.44. Multiplying 0.44 with 77, we have 33.88. At that time, a fraction t13 of a starting portion of the next field becomes 77−33.88{77−(1−0.44)×77}, i.e., 43.12.

In the example shown in FIG. 7, a point at which the counter can be preset (hereinafter simply referred to as a presettable point) s3 becomes a point of pulse numbers (3125 pulses×0.56) of 4Fsc corresponding to pulse numbers (77 pulses×0.56) of 8Fs that is equivalent to a value 0.56 which results from subtracting the fraction 0.44 from 1.

That is to say, one horizontal period and $^{840}/_{910}$ (3125 pulses×0.56=1750) become the presettable point s3. An equation for obtaining a presettable point is expressed by the following equation (1):

$$3125 \times \text{fraction of } (1 - 0.44 \times \text{field number}) \quad \ldots (1)$$

In the case of 132 fields, for example, 0.44×132 (field number)=58.08 is established and a fraction thereof becomes 0.08. Then, 3125×(1−0.08)=2875 is established, and one horizontal period has 910 pulses (the number of 4Fsc pulses whose frequencies are 4 times the subcarrier frequency). Accordingly, if 2875 is divided by 910, then 3 horizontal periods and $^{145}/_{910}$ become the presettable point s3.

Of the aforesaid conditions, if there is a presettable point and the $^{735}/_{736}$-adic interval of the preceding stage is not yet finished, then a presettable point is further delayed by 77 pulses. Such a point exists within a field that satisfies the following conditions within 200 fields.

These conditions will be described with reference to FIG. 8.

Figure 8:
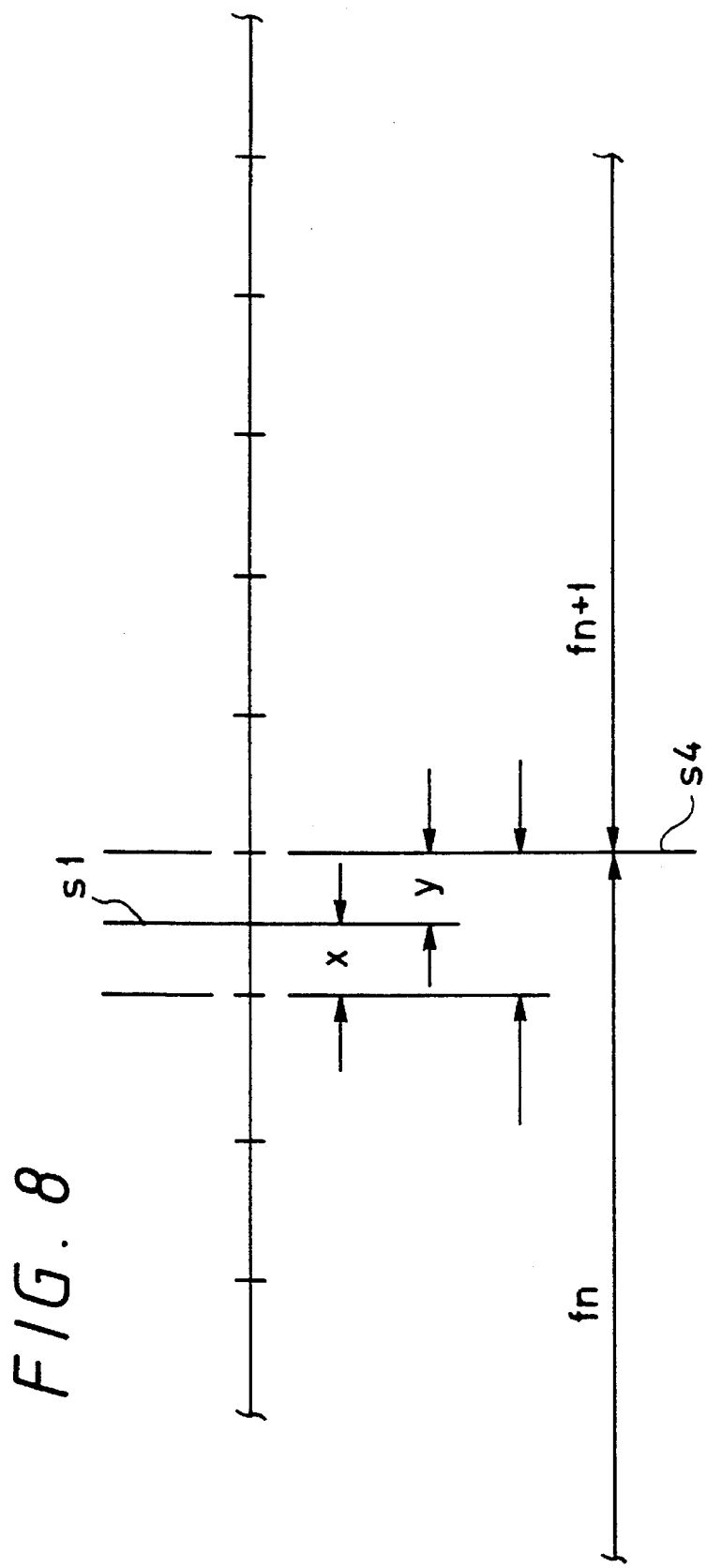
FIG. 8 is a diagram used to explain the delay of a presettable point in the synchronizing apparatus according to the embodiment of the present invention.

In FIG. 8, s1 assumes a vertical synchronizing position, x and y assume fractions which result when one sample of digital audio data crosses the vertical synchronizing position s1, and s4 assumes a boundary point between the present field fn and the next field fn+1.

It is advantageous that the presettable point is behind the vertical sync. signal and at the beginning of $^{735}/_{736}$-adic interval. To this end, the following conditions are required.

These conditions are such one that the boundary point s4 is ahead of the vertical synchronizing position s1 and the presettable point is behind the vertical synchronizing position s1 and that the boundary point s4 is behind the vertical synchronizing position s1 and the presettable point is behind the boundary point s4.

However, if the boundary point s4 is behind the vertical synchronizing position s1 and the presettable point falls within a range shown by y in FIG. 8, the preset point becomes the last of the $^{735}/_{736}$-adic interval and therefore must be further delayed by 77 pulses.

That is, the condition is that the count interval of the $^{735}/_{736}$-adic counter, i.e., the frequency divider 19 shown in FIG. 2 is a point at which the fraction of (0.735×field number) is raised and a value which results from calculating the presettable point by fraction sample of (77÷8)×(1−0.44× field number) falls within the range shown by y in FIG. 8.

This case is that the value x shown in FIG. 8 is raised and becomes larger than 0.5 and less than 0.995 (y is larger than 0.005 and less than 0.5). Also, a presettable point {value which results from calculating the same as a fraction sample of (77÷8)×(1−0.44×field number)} falls within the range shown by y in FIG. 8.

If field number (0 to 199 fields) of (0.44×field number) is taken as (25×N+α) fields, then a fraction (25×N) is "0" so that the total fraction is determined only by α. Accordingly, it is to be understood that there are 25 fractions (0 to 24).

A fraction that the boundary point s4 can fall within the range shown by y in FIG. 8 becomes 0.96 because 0.44× 9=3.96 is established if α=9. If this fraction is set behind the vertical synchronizing position s1, then there is provided (1−0.96)×$^{77}/_{8}$, i.e., 0.385 sample.

The 0.385th sample satisfies the condition that the sample is less than 0.5 sample. Then, presettable points become 9 (y=0.385), 34 (omitted), 59 (omitted), 84 (y=0.26), 109 (omitted), 134 (omitted), 159 (y=0.135), and 184 (omitted) fields, respectively.

If α=0, then the presettable point is coincident with the vertical synchronizing position s1 so that presettable points become 0 (reference), 25 (omitted), 50 (y=0.25), 75 (omitted), 100 (y=0.5), 125 (y=0.125), 150 (omitted), and 175 (y=0.357) fields, respectively. Numerical values in parentheses represent sample numbers from the vertical synchronizing position s1 to the boundary point s4. In the case of omission, the boundary point s4 is located ahead of the vertical synchronizing position s1 and therefore need not be referred to herein.

That is, in the 50 (y=0.25), 100 (y=0.5), 125 (y=0.125) and 175 (y=0.357) fields, the presettable points fall within the range shown by y in FIG. 8. Accordingly, if the preset point is not delayed by $^{77}/_{8}$ (77 pulses in 8Fs), then the preset point is not located at the beginning of $^{735}/_{736}$-adic interval. There are provided four fields that are fields of integral multiple of 25 fields.

Referring back to FIG. 5, the explanation in FIGS. 6 to 8 will be completed below.

The field is set to 735-adic interval t1 if the fraction x which results when one sample of digital audio data shown by 1Ts crosses the vertical synchronizing position s1 is less than 0.5. The field is set to 736-adic interval t2 if the fraction x is larger than 0.5.

Then, since the load point s2 at which data is loaded is constantly set to 77-pulse (8Fs) cycle as shown by the interval t5 of FIG. 5, the fraction (0.44) up to the vertical synchronizing position s1 at 77-pulse (8Fs) cycle within one field becomes different in each field.

Accordingly, if the interval t5 is set to 77 pulses, then the load point s2 at which data can be loaded to the next counters, i.e., the frequency dividers 12 and 19 is set to the interval t7 {(fraction of 1-(0.44×field number)×3125 (77 at 8Fs)} from the illustrated position, i.e., the vertical synchronizing position s1 to the load point s2. If the interval is set to 132 fields, for example, then 0.44×132=58.08 is established and a fraction thereof becomes 0.08. Multiplying 0.08 with 3125, we have 2875. That is, it is sufficient that the preset point is shifted by 2875.

As shown in FIG. 5, in the case of 735-adic interval, the preset point is shifted by the shift amount shown by the load data interval t3 by the data loading. In the case of 736-adic interval, the preset point is shifted by the shift amount shown by the load data interval t4 by the data loading.

If the load point s2 falls within the range shown by y, then the load point is delayed by 77 pulses (8Fs).

Operation of the synchronizing apparatus shown in FIG. 2 will be described with reference to FIGS. 9 and 10. As the operation of the synchronizing apparatus, operation of the control circuit 16 shown in FIG. 2 plays a great part and therefore operation of the control circuit 16 will be described below.

Figure 9:
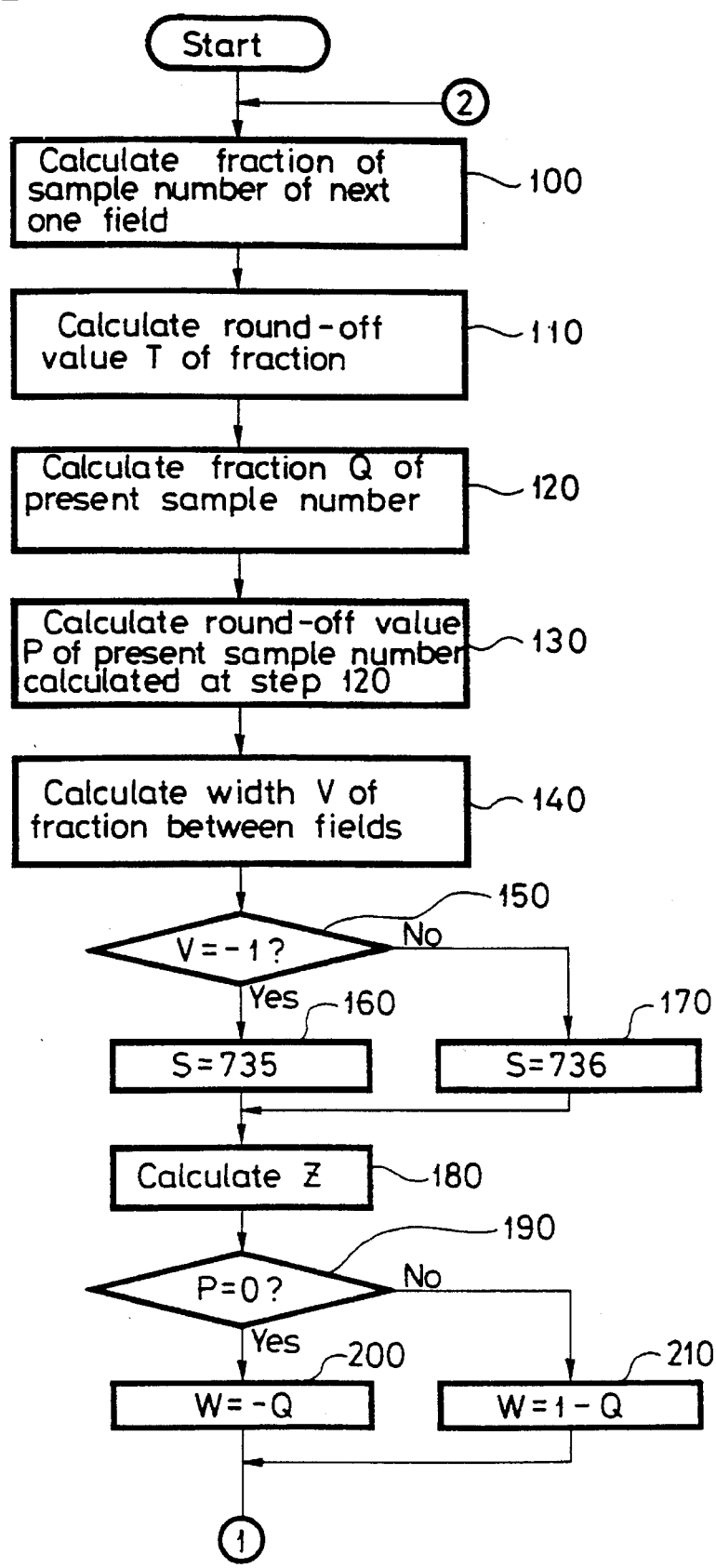
FIG. 9 is a flowchart to which references will be made in explaining operation of the embodiment of the synchronizing apparatus according to the present invention.

Referring to FIG. 9, following the start of operation, in step 100, a fraction of the sample number in the next one field is calculated. Then, the processing proceeds to the next step 110. If a sample number of the next one field is taken as R and a variable I is taken as a field number, then the sample number of the next one field is expressed by the following equation (2).

$$R = 0.735 \times (I+1) - INT\ (0.735 \times (I+1)) \qquad \ldots (2)$$

In the equation (2), INT is a basis program command that is used to obtaining an integer by omitting the numbers after the decimal point. In this case, although equations are expressed by the basic program in order to facilitate the explanation, the language of program is not limited to the basic program language and any other program languages may be used so long as they can provide many target numerical values.

As shown in FIG. 9, at step 110, a round-off value T of the fraction is calculated. Then, the processing proceeds to the next step 120. The round-off value T of this fraction is calculated by the following equation (3).

$$T = INT\ (R+0.5) \qquad \ldots (3)$$

In the equation (3), the round-off is realized by rounding off the decimal point of the calculated result which results from adding R with 0.5.

In the next step 120, a fraction Q of the present sample number is calculated. Then, the processing proceeds to the next step 130. The fraction Q of the present sample number is calculated by the following equation (4).

$$Q = 0.735 \times I - INT\ (0.735 \times 1) \qquad \ldots (4)$$

In step 130, a round-off value P of the fraction Q of the present sample number calculated at step 120 is calculated. Then, the processing proceeds to the next step 140. This round-off value P is calculated by the following equation (5).

$$P = INT\ (Q+0.5) \qquad \ldots (5)$$

In step 140, a width V of the fraction between the fields is calculated. Then, the processing proceeds to the next step 150. The width V of the fraction between the fields is calculated by the following equation (6).

$$V = T - P \qquad \ldots (6)$$

It is determined in the next decision step 150 whether or not the width V of the fraction between the fields is "−1". If a YES is output at decision step 150, then the processing proceeds to step 160. If a NO is output at decision step 150, then the processing proceeds to step 170.

In step 160, a variable S is set to 735, and then the processing proceeds to the next step 180. That is, the count value of the present field number is set to 735.

In step 170, the variable S is set to 736, and then the processing proceeds to the step 180. That is, the count value of the present field number is set to 736.

In the aforesaid steps, the fractions of the sample numbers of the present field and the next field are calculated, respectively, and the fractions thus calculated are rounded-off, respectively. Then, the rounded-off value of the fraction of the next field is subtracted from the rounded-off value of the fraction of the present field. Then, only when the subtracted result is −1, the frequency divider 19a shown in FIG. 2 is selected (switching signal is set to "1"). When the subtracted result is a values other than −1, the frequency divider 19b shown in FIG. 2 is selected (switching signal is set to "0").

As described above, if one field of the video signal is divided by the frequency of 44.1 kHz of the digital audio data, then one field becomes 735.735 samples. Accordingly, the addition of the fraction of the next field and the fraction of the present field yields 0.735. Therefore, the fraction of the sample number at each field can be calculated if 0.735 is multiplied with the field number and subtracted by the integral amount. Therefore, the conditions that one field becomes 735 samples are those in which the fraction of the present field and the fraction of the next field are calculated and rounded-off and the calculated result is −1, i.e., the rounded-off value on the present field side is larger than 0.5 and less than 0.760 and the rounded-off value on the next field is larger than 0.235 and less than 0.495.

In step 170, the variable S is set to 736, and then the processing proceeds to the next step 180. That is, the frequency divider 19b is selected (switching signal is set to "0").

In step 180, the next load point (fraction of the field) Z is calculated from the vertical sync. signal, and then the processing proceeds to the next decision step 190. The load point Z can be calculated by the following equation (7).

$$Z = 1 - (0.44 \times I - INT\ (0.44 \times I)) \qquad \ldots (7)$$

The 0.44 is the fraction up to the vertical synchronizing position s1 at 77 pulses (8Fs) within one field as earlier noted and is different at every field.

It is determined in decision step 190 whether or not the rounded-off value P of the fraction Q of the next field calculated at step 130 is "0". If a YES is output at decision step 190, then the processing proceeds to step 200. If a NO is output at decision step 190, then the processing proceeds to step 210.

Figure 10:
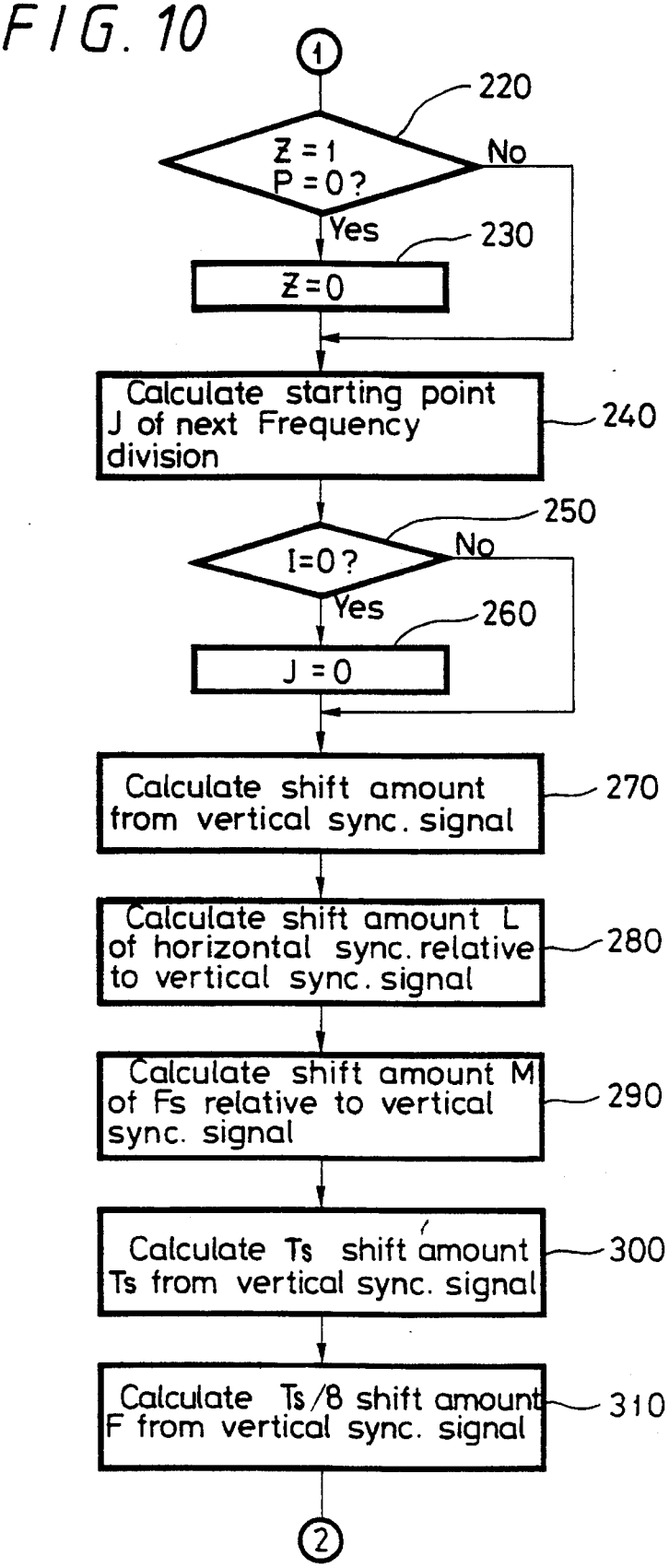
FIG. 10 is a flowchart which is a continuation of the flowchart in FIG. 9 and to which references will be made in explaining operation of the embodiment of the synchronizing apparatus according to the present invention.

In step 200, a variable W is set to -Q and then the processing proceeds to the next decision step 220 of a flowchart shown in FIG. 10.

In step 210, the variable W is set to 1-Q, and then the processing proceeds to the next decision step 220 of the flowchart shown in FIG. 10.

In the steps 190 to 210, there are formed the phase conditions relative to the vertical sync. signal on the basis of 735 or 736-count. When the rounded-off value P of the fraction of the present field is "0", the variable W is set to the minus value of the fraction of the present field. When the rounded-off value P of the fraction of the present field is a value other than "0", the variable W is set to the value which results from subtracting the fraction of the present field from 1.

It is determined in decision step 220 whether the load point (presettable point) Z is "2" and the rounded-off value P of the fraction of the present field is "0". If a YES is output at decision step 220, then the processing proceeds to step 230. If a NO is output at decision step 220, then the processing proceeds to step 240. As earlier noted, it is detected that the presettable point becomes coincident with the position of the vertical sync. signal.

In step 230, the load point Z is set to "0", and then the processing proceeds to step 240.

In step 240, a starting point J of the next frequency division is calculated. Then, the processing proceeds to the next step 250. This starting point J is calculated by the following equation (8).

$$J = INT (Z \times 77 - W \times 8 + 0.5) \qquad \ldots (8)$$

In the equation (8), in step 230 when Z is set to "0", the presettable point is coincident with the vertical synchronizing point. Accordingly, the fraction of the current sample number is multiplied by 8, added to 0.5 and rounded off. In other words, this equation (8) calculates a distance between the end of the count by the frequency divider 19 and the presettable point.

It is determined in decision step 250 whether or not the field number (number) I is "0". If a YES is output at decision step 250, then the processing proceeds to the next step 260. If on the other hand a NO is output at decision step 250, then the processing proceeds to step 270. The processing at step 260 is an initialization so that, only when the field number is "0", the starting point J is set to "0".

In step 270, a shift amount Y from the vertical synchronizing signal is calculated, and then the processing proceeds to the next step 280. This shift amount Y can be calculated by the following equation (9).

$$Y = Z \times 3125 \qquad \ldots (9)$$

In step 280, a shift amount L of horizontal synchronization relative to the vertical sync. signal is calculated. Then, the processing proceeds to the next step 290. This shift amount L can be calculated by the following equation (10).

$$L = INT (Y/910) \qquad \ldots (10)$$

In step 290, a shift amount M of Fs relative to the vertical sync. signal is calculated. Then, the processing proceeds to the next step 300. The shift amount M of Fs can be calculated by the following equation (11).

$$M = INT ((Y - L \times 910) + 0.5) \qquad \ldots (11)$$

In step 300, an Ts shift amount from the vertical sync. signal is calculated. Then, the processing proceeds to the next step 310. The Ts shift amount Ts can be calculated from the following equation (12).

$$Ts = INT (J/8) \qquad \ldots (12)$$

In step 310, an Ts/8 shift amount from the vertical sync. signal is calculated. Then, the processing again proceeds to the step 100 shown in the flowchart of FIG. 9. This Ts/8 shift amount F can be calculated by the following equation (13).

$$F = (J/8 - Ts) \times 8 \qquad \ldots (13)$$

The data thus generated are illustrated in FIGS. 11 and 12. FIGS. 11 and 12 show field Nos. the number of samples (count number of the frequency divider 19), shift amount from the vertical sync. signal (910 denotes the number of pulses having a frequency 4 times the subcarrier frequency corresponding to the horizontal period) and load values at every field (only important points are illustrated and others are not shown).

In the case of the field having the field No. "0", the number of samples becomes 736 and the frequency divider 19b is selected. At that time, the shift amount relative to the vertical sync. signal becomes $1/910 \times 0$, i.e., "0" and the load value is represented by $Ts/8 \times 0$, i.e., "0".

In the case of the field having the field No. "1", the number of samples becomes 735 and the frequency divider 19a is selected. At that time, the shift amount relative to the vertical sync. signal becomes $1 + 1/910 \times 840$ and the load value becomes $5 + Ts/8 \times 1$.

The "1" in "$1 + 1/910 \times 8$" represents the shift amount of horizontal synchronization from the vertical sync. signal, "8" represents the shift amount of $1/910$ from the vertical sync. signal, "5" in "$5 + Ts/8 \times 1$" that indicates the load value represents the sample shift amount Ts from the vertical sync. signal, and "1" that is multiplied by Ts/8 represents the Ts/8 shift amount F from the vertical sync. signal. This is also true for the following respective parameters.

In the case of the field having the field No. "2", the number of samples becomes 736 and the frequency divider 19b is selected. At that time, the shift amount relative to the vertical sync. signal becomes $0 + 1/910 \times 375$, and the load value becomes $1 + Ts/8 \times 5$.

In the case of the field having the field No. "49", the number of samples becomes 736 and the frequency divider 19b is selected. At that time, the shift amount relative to the vertical sync. signal becomes $1 + 1/910 \times 465$, and the load value becomes $4 + Ts/8 \times 2$.

In the case of the field having the field No. "50", the number of samples becomes 735 and the frequency divider 19a is selected. At that time, the shift amount relative to the vertical sync. signal becomes $3 + 1/910 \times 395$, and the load value becomes $9 + Ts/8 \times 3$. In the 50th field, the load point (presettable point) becomes coincident with the position of the vertical sync. signal.

In the case of the field having the field No. "98", the number of samples becomes 736 and the frequency divider 19b is selected. At that time, the shift amount relative to the vertical sync. signal becomes $3 + 1/910 \times 20$, and the load value becomes $8 + Ts/8 \times 1$.

In the case of the field having the field No. "99", the number of samples becomes 736 and the frequency divider 19b is selected. At that time, the shift amount relative to the vertical sync. signal becomes $1 + 1/910 \times 465$, and the load value becomes $4 + Ts/8 \times 0$.

In the case of the field having the field No. "100", the number of samples becomes 735 and the frequency divider 19a is selected. At that time, the shift amount relative to the vertical sync. signal becomes $3 + 1/910 \times 395$, and the load value becomes $9 + Ts/8 \times 1$. In the 100th field, the load point (presettable point) becomes coincident with the position of the vertical sync. signal.

In the case of the field having the field No. "124", the number of samples becomes 736 and the frequency divider 19b is selected. At that time, the shift amount relative to the vertical sync. signal becomes 1+1/910×465, and the load value becomes 4+Ts/8×3.

In the case of the field having the field No. "125", the number of samples becomes 736 and the frequency divider 19a is selected. At that time, the shift amount relative to the vertical sync. signal becomes 3+1/910×395, and the load value becomes 9+Ts/8×4. In the 125th field, the load point (presettable point) becomes coincident with the position of the vertical sync. signal.

In the case of the field having the field No. "174", the number of samples becomes 736 and the frequency divider 19b is selected. At that time, the shift amount relative to the vertical sync. signal becomes 1+1/910×465, and the load value becomes 4+Ts/8×1.

In the case of the field having the field No. "175", the number of samples becomes 735 and the frequency divider 19a is selected. At that time, the shift amount relative to the vertical sync. signal becomes 3+1/910×395, and the load value becomes 9+Ts/8×2. In the 174th field, the load point (presettable point) becomes coincident with the position of the vertical sync. signal.

In the case of the field having the field NO. "200", the number of samples becomes 736 and the frequency divider 19b is selected. At that time, the shift amount relative to the vertical sync. signal becomes 1/910×0, i.e., "0" and naturally the load value becomes Ts/8×0, i.e., "0".

Figure 13:
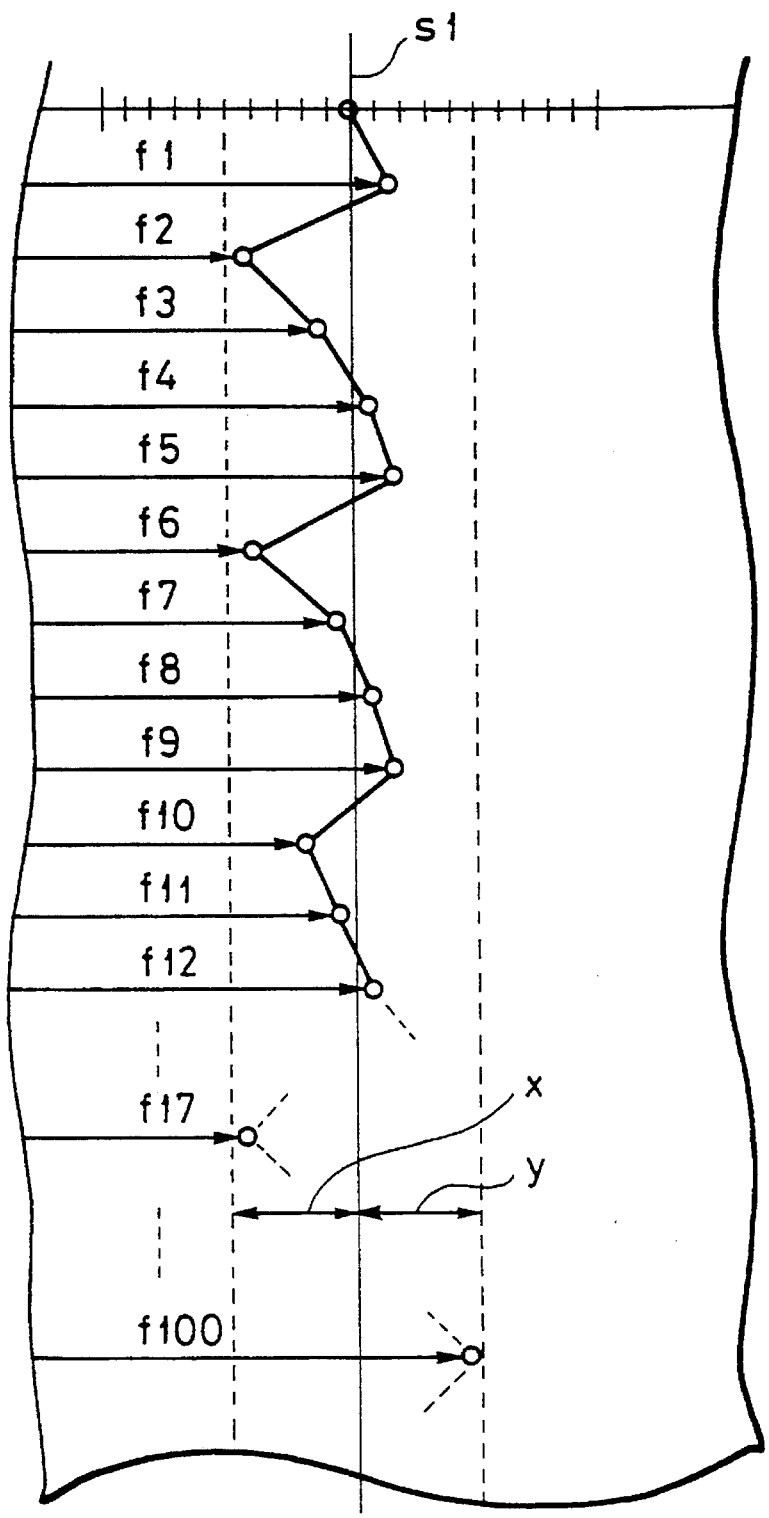
FIG. 13 is a schematic diagram used to explain the synchronizing apparatus according to the embodiment of the present invention.

As described above, since the audio signal processing counter is preset such that 735 or 736 samples of audio data exist in the vertical sync. signal of the video signal, the video and audio data can be synchronized with each other within one field. FIG. 13 is a schematic diagram used to explain the synchronizing apparatus of the instant invention. This FIG. is in the style of FIG. 1, wherein shift amounts of fields 1–100 are depicted. Thus, without preparing extra pre-roll time in addition to the time required to fine adjust the tape speed, the editing of very high accuracy can be carried out.

According to the present invention, there is provided the synchronizing apparatus which can synchronize a standard video signal with the audio signal sampled by the clock having the sampling frequency different from that of the above video signal. In this synchronizing apparatus, since the audio signal processing counter is preset so that audio data having the predetermined sample number n or the predetermined sample number+1 of audio signal exist in the vertical sync. signal of video signal, the video and audio data can be synchronized with each other within one field. Thus, without preparing extra pre-roll time in addition to the time required to fine adjust the tape speed, the editing of very high accuracy can be carried out.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A synchronizing apparatus for synchronizing an audio signal with a standard video signal, a sampling frequency of said audio signal differing from a sampling frequency of said standard video signal, comprising:

a memory;

counter means for outputting a count signal representing a count value; and first and second frequency dividers each continuously receiving a signal having a frequency equal to the sampling frequency of said audio signal for continuously presetting two respective preset values of n and n+1 and supplying said preset values to said memory, said preset values of n and n+1 representing a number of samples of said audio signal to be inserted into a vertical interval of said video signal, wherein said memory is adapted for memorizing said audio signal and outputting said audio signal according to said count signal and said preset values, whereby said audio signal synchronized with said standard video signal is read out from said memory.

2. A synchronizing apparatus according to claim 1, wherein said first and second frequency dividers selectively continuously preset said preset values of n and n+1 and supply said preset values to said memory according to a difference between an input timing of a vertical synchronizing signal of said standard video signal fed thereto and an input timing of a final signal from said counter means.

3. A synchronizing apparatus according to claim 1, wherein said standard video signal is an NTSC video signal.

4. A synchronizing apparatus according to claim 1, wherein said sampling frequency of said audio signal is 44.1 kHz.

5. A synchronizing apparatus for synchronizing an audio signal with a standard video signal, a sampling frequency of said audio signal differing from a sampling frequency of said standard video signal, comprising:

synchronizing means;

counter means for outputting a count signal representing a count value; and first and second frequency dividers each continuously receiving a signal having a frequency equal to the sampling frequency of the audio signal for continuously presetting two respective preset values of n and n+1 and supplying said preset values to said synchronizing means, said preset values of n and n+1 representing a number of samples of said audio signal to be inserted into a vertical interval of said standard video signal;

said synchronizing means being adapted for synchronizing said audio signal with said standard video signal according to said count signal and said preset values.

6. A synchronizing apparatus according to claim 5, wherein said first and second frequency dividers selectively continuously preset said preset values of n and n+1and supply said preset values to said synchronizing means according to a difference between an input timing of a vertical synchronizing signal of said standard video signal and an input timing of a final signal from said counter means

* * * * *

UNITED STATES PATENT AND TRADEMARK OFFICE
CERTIFICATE OF CORRECTION

PATENT NO. : 5,463,425
DATED : October 31, 1995
INVENTOR(S) : Katsuichi Tachi It is certified that error appears in the above-identified patent and that said Letters Patent is hereby corrected as shown below: Title page,

```
In the Abstract, line 6, change ". Wherein" to --wherein--
Col. 2, line 9, after "becomes" insert --a--
        line 14, after "vertical" delete "-"
Col. 5, line 66, change "TS" to --FS--
        same line, change "Fs" to --Ts--
Col. 6, line 31, change "signals" to --signal--
        line 39, change "13" to --8--
        line 43, change "8" to --13--
Col. 8, line 6, after "of" first occurrence, delete "-"
Col. 9, line 5, after "conditions" insert --are--
Col. 11, line 39, change "basis" to --basic--
Col. 12, line 27, change "values" to --value--
Col. 13, line 11, change ""2"" to --"1"--
        line 61, change "Ts" first occurrence, to --sample--
Col. 15, line 19, change "174th" to --175th--

Col. 16, line 53, change "n+1and" to --n+1 and--
        line 57, after "means" insert --.--
```

Signed and Sealed this

Twenty-seventh Day of August, 1996

Attest:

BRUCE LEHMAN

Attesting Officer

Commissioner of Patents and Trademarks